United States Patent [19]
Hsia

[11] Patent Number: 5,850,644
[45] Date of Patent: Dec. 22, 1998

[54] TEMPERATURE AND PRESSURE CONTROL MEANS FOR WATER BED

[76] Inventor: Yu Chun Hsia, No. 3, Chiao Ai 9th Road, Hsin Tien City, Taipei Hsien, Taiwan

[21] Appl. No.: 518,807

[22] Filed: Aug. 24, 1995

[51] Int. Cl.$^6$ .................................................... A47C 27/08
[52] U.S. Cl. ............................ 5/422; 5/672; 5/683; 5/674
[58] Field of Search ............................... 5/421, 422, 672, 5/683, 674, 713, 916

[56] References Cited

U.S. PATENT DOCUMENTS

| | | | |
|---|---|---|---|
| 3,317,934 | 5/1967 | Hinrichs | 5/674 X |
| 3,760,147 | 9/1973 | Tyrey | 5/422 X |
| 4,135,500 | 1/1979 | Gorran | 5/174 X |
| 4,814,583 | 3/1989 | Rainey | 5/422 X |
| 5,189,742 | 3/1993 | Schild | 5/713 |
| 5,396,671 | 3/1995 | Stacy | 5/713 X |
| 5,448,788 | 9/1995 | Wu | 5/421 |
| 5,555,579 | 9/1996 | Wu | 5/421 |
| 5,560,374 | 10/1996 | Viard | 5/713 X |

Primary Examiner—Michael F. Trettel
Attorney, Agent, or Firm—Rosenberg, Klein & Bilker

[57] ABSTRACT

A temperature and pressure control system for a water bed is provided and includes a temperature control circuit and a pressure control circuit. The temperature control circuitry consists of two temperature detecting elements for detecting an ambient air temperature and the mattress temperature, respectively. The detected temperatures are compared with each other and the resulting value, together with a set value from an adjusting circuit, are processed by a microprocessor to produce a target temperature. When the target temperature is higher or lower than the mattress temperature, a heater is turned on or off, respectively, so that the mattress can be maintained at a value set according to a user's preferred temperature. The pressure control circuitry consists of a pressure detecting element for detecting the air pressure within air chambers of the mattress. A signal representing the detected pressure is amplified and is converted to a digital signal by an analog-to-digital conversion circuit, to produce a pressure value. When the pressure value is higher or lower than a preset pressure value, a relief valve or an air pump is actuated to deflate or inflate the mattress, respectively, to maintain a mattress softness most preferred by a user.

4 Claims, 7 Drawing Sheets

TEMPERATURE AND PRESSURE CONTROL MEANS FOR WATER BED

BACKGROUND OF THE INVENTION

The present invention relates to a temperature and pressure control means for a water bed. More particularly the present invention is directed to a control circuitry for properly maintaining a water bed at a temperature and pressure suitable for human beings.

Increasing technological development has continually improved the standard of living for people. Comfortableness and convenience in the use of various kinds of products has been an importance requirement. A water bed, for example, has been introduced to replace the conventional bed with a spring mattress and is widely welcomed by consumers. While the water bed has the advantages of being soft and comfortable, it has the disadvantage of, for example, requiring a long time period to heat or cool the water bed mattress because of a huge volume of water that is required to be stored in the mattress. There is a water bed consisting of a plurality of internal air chambers being developed to eliminate the above disadvantage. FIG. 1 illustrates such improved water bed with multiple air chambers. The water bed 1 is internally divided into a plurality of alternately arranged inflatable air chambers 12 and water reservoirs 13, so that the whole water bed mattress 1 can be easily controlled to provide a temperature and softness that is most suitable for human beings, especially when the ambient temperature is high. On the other hand, when the ambient temperature is low, the water bed mattress needs to be heated. A common heating means for a water bed works only within a certain limited temperature range and cannot be properly adjusted corresponding to the ambient temperature. Further, the rate of heat dissipation from a quilt on the bed into the atmosphere is changeable and will affect the amount of heat required in the space between the mattress and the quilt to balance the temperature therein and accordingly affect the comfort of users sleeping on the mattress. As for the internal pressure of the mattress, it needs to be changeable to meet the different preferences of different users.

SUMMARY OF THE INVENTION

It is therefore a primary object of the present invention to provide a temperature and pressure control means for a water bed. The temperature and pressure control means includes temperature control circuitry using temperature detecting elements to separately sense ambient air temperature and bed mattress temperature. Moreover, parameters such as the rate of heat dissipation of the quilt, the temperature value preferred by the individual user, the thermal conductivity of the mattress surface, etc., together with the detected temperature values, are calculated to find a target temperature value. When an individually preferred temperature value is set and calculated by a microprocessor, a target temperature is produced. When the target temperature is lower or higher than the mattress surface temperature, a heater is turned on or off so that the space between the mattress and the quilt is constantly maintained at a temperature that is most suitable and comfortable for the user.

Another object of the present invention is to provide a pressure control circuit using a pressure detecting element to detect an internal pressure of the water bed mattress. The detected value is amplified and subjected to an analog-to-digital conversion to produce a pressure value which can be handled by the microprocessor. When the detected pressure value is lower or higher than a set value, an air pump is actuated to inflate or deflate the water bed mattress, so that the mattress can always maintain a softness that is most suitable and comfortable for the user.

A further object of the present invention is to provide a water bed with a pressure control circuit in which an air pump uses pressure pulsations to inflate the mattress and thereby provides a moderate pulsatile massage effect. Moreover, when the mattress has an internal pressure exceeding a preset critical value, a pressure-relief electromagnetic valve is actuated to open, to maintain the water mattress pressure in an ideal state.

BRIEF DESCRIPTION OF THE DRAWINGS

The present invention can be best understood through the following detailed description of the preferred embodiment and the accompanying drawings, wherein.

DETAILED DESCRIPTION OF THE PREFERRED EMBODIMENTS

Figure 1:
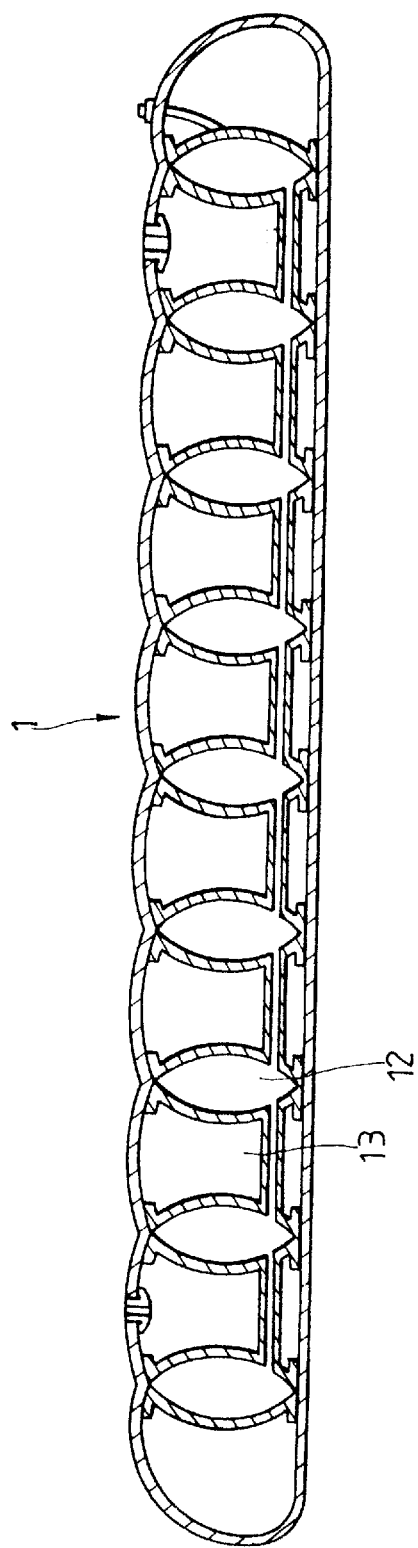
FIG. 1 is a sectional view of a water bed mattress with air chambers.
Figure 2:
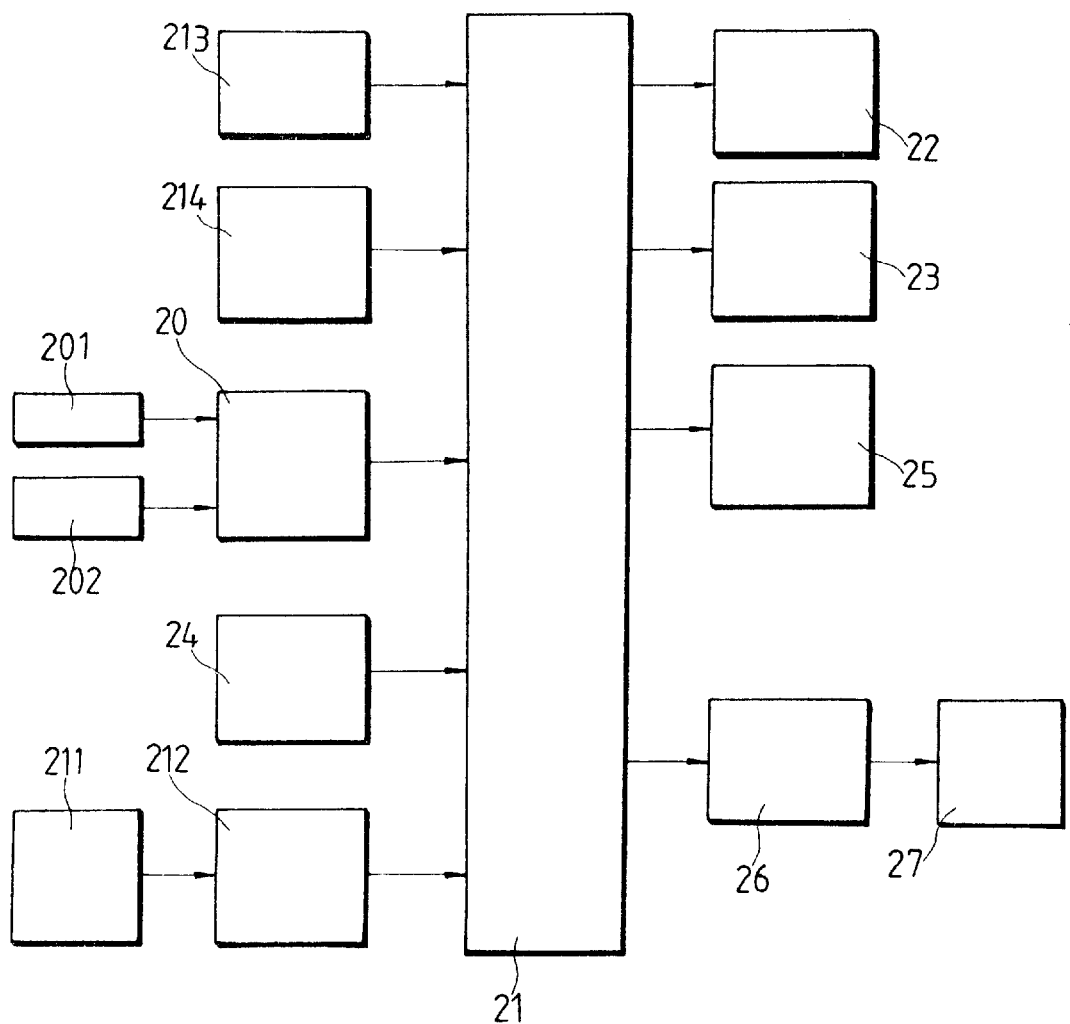
FIG. 2 is a block diagram of the temperature control circuit of the present invention.

Referring to FIG. 2, there is shown a block diagram of a temperature control circuit according to the present invention. The temperature control circuit includes two temperature detecting elements 201, 202 for detecting the ambient air temperature and the mattress temperature, respectively. The detected values are displayed in two indicators 22, 23. The detected values are compared with related parameters by a comparison circuit 20 and a resultant value is sent to a microprocessor 21 for calculating a temperature value corresponding to the resultant value. An adjusted temperature value can be set via an adjusting circuit 24 and be sent to a register of the microprocessor 21. The microprocessor 21 operates on the ambient air temperature, the mattress temperature, and the adjusted temperature value to find a target temperature and sends the target temperature to an indicator 25 for display. When the mattress temperature is higher than the target temperature 25, the microprocessor 21 controls a relay 26 to release, causing a heater 27 to stop heating. When the mattress temperature is lower than the target temperature 25, the relay 26 is driven to close and cause the heater to heat, thereby keeping the mattress at a proper temperature. A working voltage required by the temperature control circuit is supplied by a rectification circuit 211 and a voltage stabilization circuit 212. A timing pulse generator 213 provides the microprocessor 21 with timing pulses. A reset circuit 214 generates a data-clear signal at the time of power-on, so that the entire temperature control circuit is in a standby state when the temperature control means is turned on.

Figure 3:
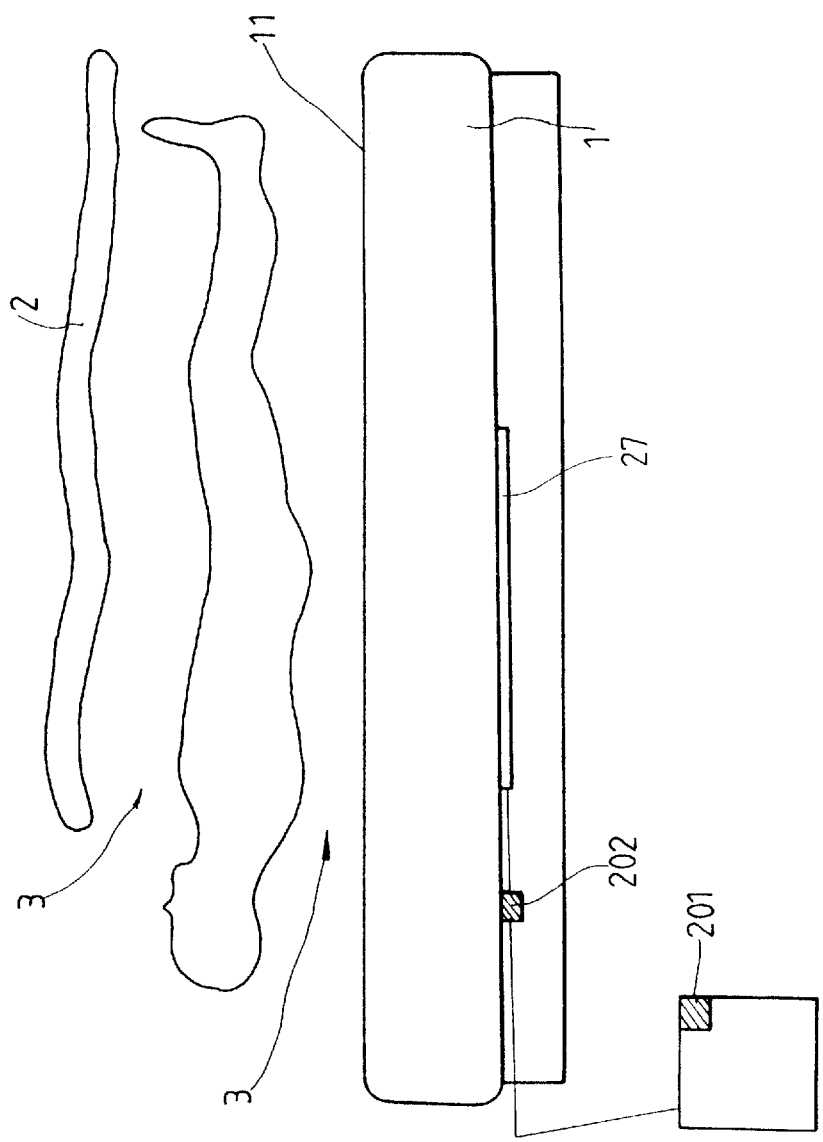
FIG. 3 illustrates the arrangement of the temperature detecting elements of the present invention.

The temperature control of the present invention is effectuated by the temperature detecting elements 201, 202, shown in FIG. 3, which detect the ambient air temperature and the mattress temperature, respectively. When a user lies on the mattress between a surface 11 thereof and a quilt 2 covering the user, a heat dissipation rate of the quilt 2 can be calculated from the thickness and material of the quilt 2 as well as the temperature difference between the temperatures detected by the elements 201, 202. A thermal conductivity of the mattress surface 11 can be calculated from a difference in temperature between the mattress temperature and a user's preferred temperature 3 so as to adjust the mattress to the user's preferred temperature 3. Accordingly, a target temperature can be calculated from the following formula:

$$F(\text{user's preferred temperature–ambient air temperature}) \times \text{heat dissipation rate of quilt} = F(\text{target temperature–user's preferred temperature}) \times \text{thermal conductivity of mattress surface}$$

The resultant target temperature value is sent to the microprocessor for use thereby to control the heater 27 to turn on or turn off, allowing the space enclosed between the mattress surface 11 and the quilt 2 to be maintained at a constant temperature, the user's preferred temperature 3. The disadvantage of poor thermal insulation of the quilt 2 and ambient temperature changes can therefore be largely overcome.

Figure 4:
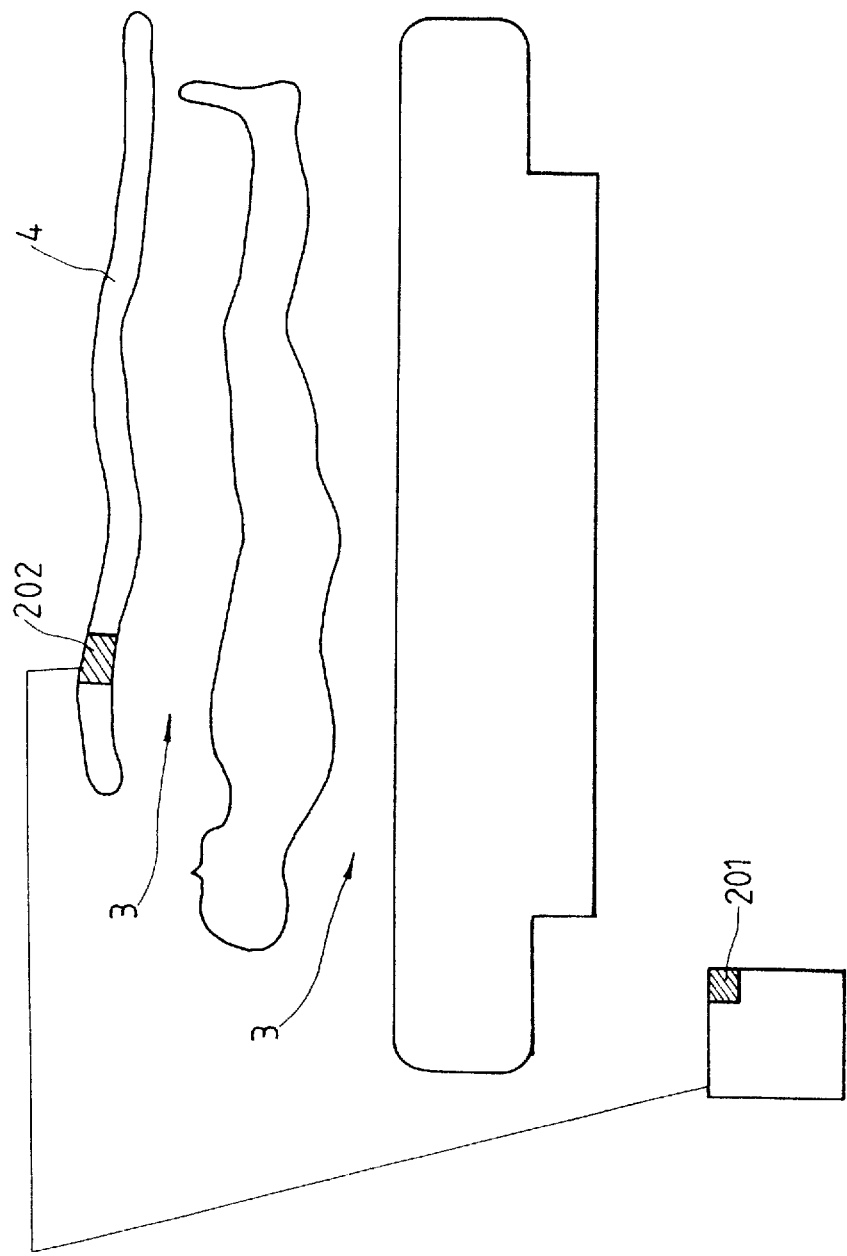
FIG. 4 illustrates another arrangement of the temperature detecting elements of the present invention.

The above described temperature control means can also be used with a conventional water bed without air chambers or an electric blanket 4, as shown in FIG. 4. Since the electric blanket 4, itself, is provided with a heating function, a proper target heating value for the electric blanket 4 can be derived from the ambient air temperature, the blanket temperature, the user's preferred temperature, and the heat dissipation rate of the blanket to achieve a constant temperature surrounding the user.

Figure 5:
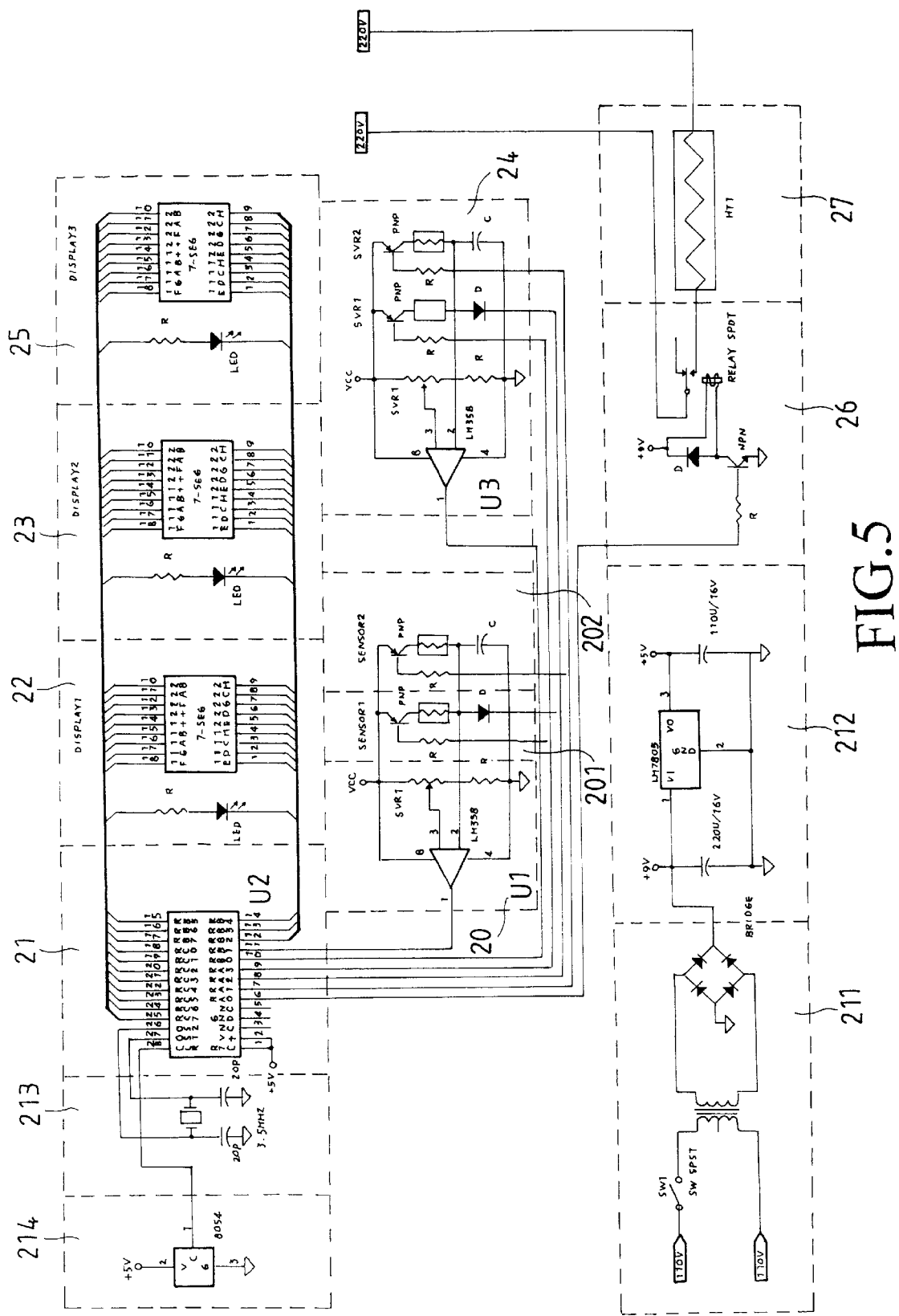
FIG. 5 is the temperature control circuit diagram of the present invention.

A circuit diagram of the present invention is shown in FIG. 5. Two temperature detecting elements SENSOR 1 and SENSOR 2 in the temperature control circuit are connected to an input of an operational amplifier U1. Signals representing the detected values from SENSORS 1, 2 are compared by the operational amplifier U1 and are then sent to a microprocessor U2. An adjusting circuit is formed by connecting SVR1 and SVR2 to another operational amplifier U3 for presetting a user's preferred temperature value and a heat dissipation rate of the quilt. Those values are supplied to the microprocessor U2. Depending on the requirements of the designed water bed, a target temperature can be calculated form the following formula:

$$F(\text{SVR1–SENSOR 1}) \times \text{SVR2} = F(\text{target temperature–SVR 1}) \times (\text{SENSOR 2–SVR1}) \text{ constant}$$

When the target temperature is higher or lower than the mattress temperature, the microprocessor U2 controls relay 26 to connect or disconnect, so as to control a heater 27 (HT1) to heat or stop heating.

Figure 6:
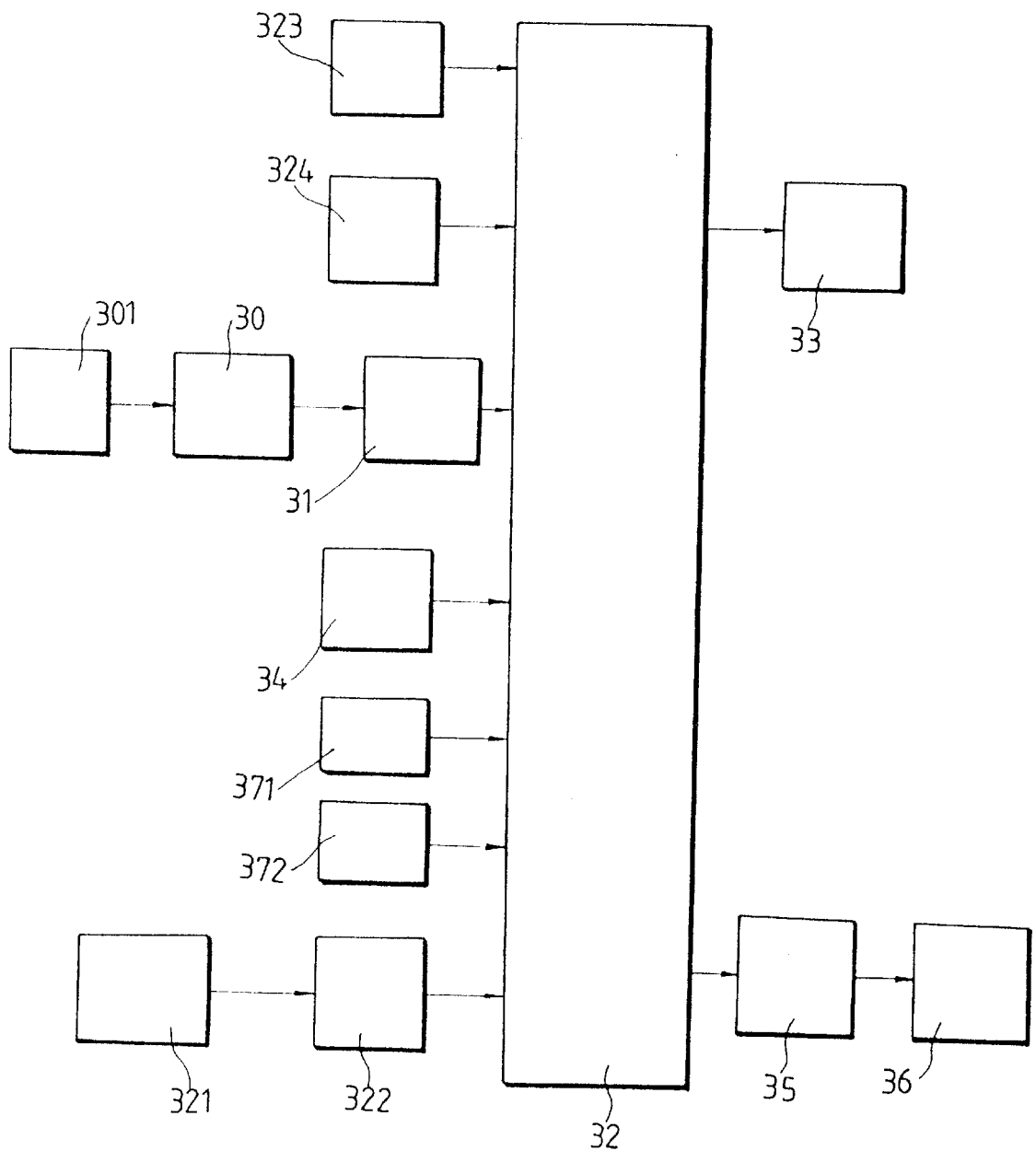
FIG. 6 is a block diagram of the pressure control circuit of the present invention.
Figure 7:
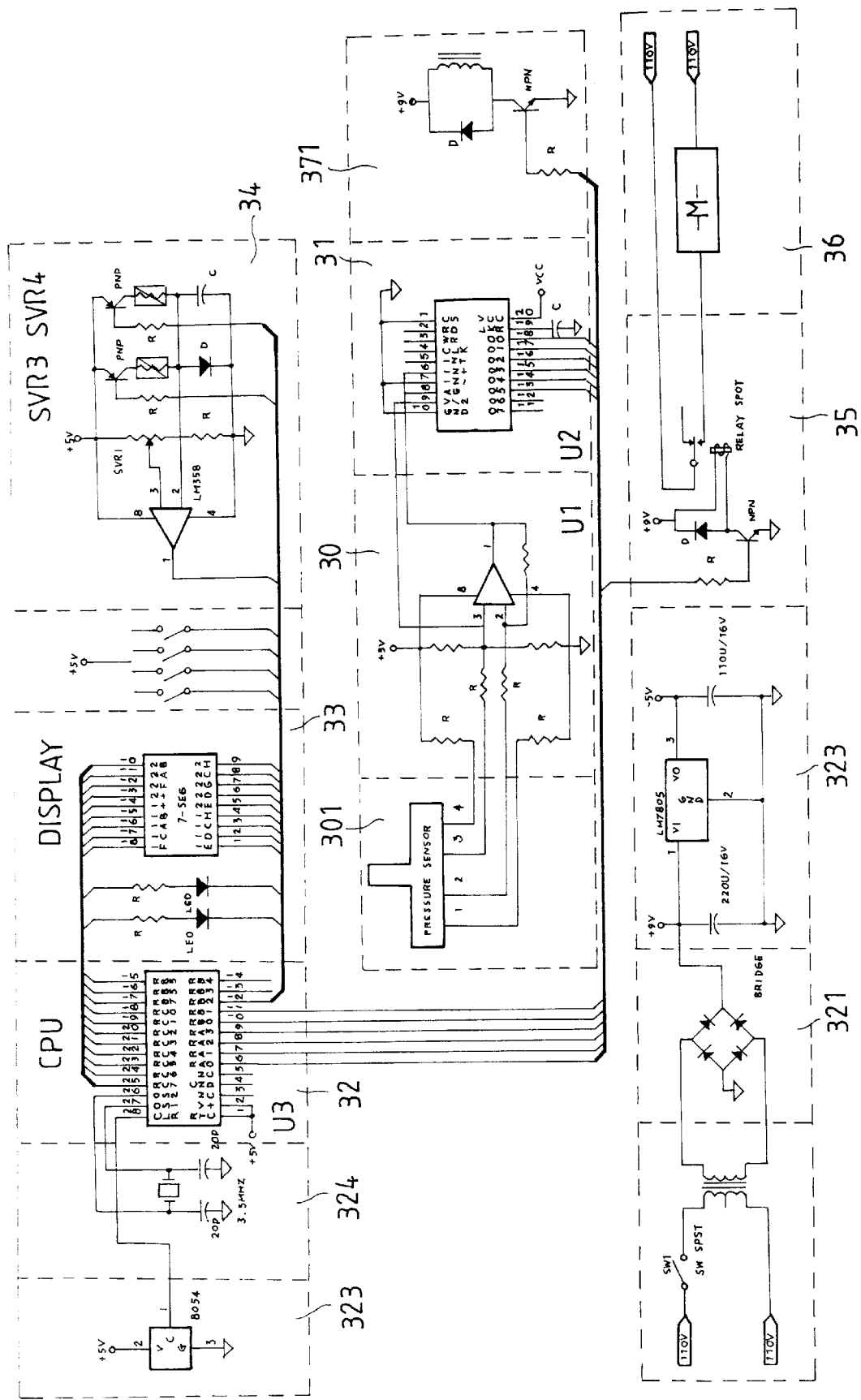
FIG. 7 is the pressure control circuit diagram of the present invention.

Referring to FIGS. 6 and 7, a block diagram and a circuit diagram of a pressure control circuit of the present invention are shown, respectively. The pressure control circuit mainly includes a pressure detecting element 301 for detecting an internal pressure of the mattress. The pressure detecting element comprises a plurality of strain gage resistors adhered to a metal diaphragm which is mounted on a seat. A central portion of the metal diaphragm is subject to a pressure to be detected and measured. When the central portion of the metal diaphragm is subjected to a pressure, the strain gages change resistance. Such change in the resistance of the strain gages is converted by the circuit into a small current change which is properly amplified by an amplification circuit 30 for input to an analog-to-digital conversion circuit 31, to convert the voltage signal from amplification circuit 30 into a digital acceptable for input to a microprocessor 32. Microprocessor 32 uses the digital date to produce a pressure value which is displayed by an indicator 33. An adjusting circuit 34 is used to preset an internal pressure of the mattress to obtain a proper softness thereof. The preset value is compared with a detected pressure value by the microprocessor 32. When the detected pressure value is higher than the preset pressure value, a signal is output to control a relay 35, causing a pressure-relief electromagnetic valve 371 to release air from inside of the mattress. When the detected pressure value is lower than the preset pressure value, the relay 35 is controlled to cause a pump 36 to inflate the mattress. In this manner, the mattress can be always maintained at a suitable pressure. Moreover, the microprocessor 32 can also be actuated through a switch 372 to cause the pump 36 to pressurize the mattress with pressure pulses, and thereby produces a moderate pulsatile massage effect. A working voltage required by the whole pressure control circuit is supplied by a rectification circuit 321 and a voltage stabilization circuit 322. A time sequence circuit 323 provides an action time sequence pulse to the microprocessor 32 and a reset circuit 324 clears the data in the microprocessor 32 at the time the circuit is turned on.

Referring now to FIG. 7, a pressure detecting element 301 (PRESSURE SENSOR) detects an internal pressure of the mattress. A small current reflecting the detected pressure is amplified by amplifier 30 (U1). An analog-to-digital converter 31 (U2) converts an analog voltage into digital data. The converted digital data are supplied to a microprocessor 32 (U3). SVR3 and SVR4 respectively adjust a preset softness and hardness of the mattress. SVR3 has a preferred adjustment range about 0–0.3 kg/cm$^2$ and SVR4 has a preferred adjustment range about 0.2–0.5 kg/cm$^2$.

When the preset value is higher or lower than the detected mattress pressure value, the microprocessor 32 controls a relay 35 (RELAY) to connect so that a pump 36 (M) is actuated to inflate the mattress or a pressure-relief electromagnetic valve 371 is actuated to relieve pressure inside the mattress.

By the above arrangement, the temperature and the pressure control circuits of the present invention maintain the mattress at a temperature and a softness most preferred by a user. Moreover, the temperature and the pressure control circuits can also be used with a water bed without internal air chambers or an electric blanket having a built-in heating device.

What is claimed is:

1. A temperature and pressure control for a water bed having a mattress with a plurality of air chambers and water reservoirs, comprising:

a temperature detecting circuit including a pair of temperature detecting elements connected in parallel with an input of a first comparator to respectively detect an ambient air temperature and a mattress temperature, said first comparator comparing said detected ambient air temperature with said detected mattress temperature and producing a resultant value at an output thereof;

a temperature adjusting circuit including a pair of first variable resistors connected in parallel with an input of a second comparator, one of said first variable resistors being used to input a preferred preset temperature value and the other of said first variable resistors being used to input a predetermined heat dissipation rate of a quilt overlaying said mattress;

a temperature control circuit including a first microprocessor coupled to a timing pulse generator for receiving pulse time sequence signals therefrom, said first microprocessor being coupled to said output of said temperature detecting circuit for input of said resultant value, said first microprocessor being coupled to said temperature adjusting circuit for input of said preferred preset temperature value and said predetermined heat dissipation rate, said first microprocessor determining a target temperature value responsive to said input of said resultant value, said preferred preset temperature value, and said predetermined heat dissipation rate, said first microprocessor having an output coupled to means for heating the mattress for (a) output of a turn-off signal responsive to said mattress temperature being higher than said target temperature, and (b) output of a turn-on signal responsive to said mattress temperature being lower than said target temperature;

a pressure detecting circuit including an analog-to-converter, an operational amplifier having an output coupled to said analog-to-digital converter and a pressure detecting element connected to an input of said operational amplifier for detecting an internal pressure of said mattress, said operational amplifier amplifying a signal from said pressure detecting element representing an internal pressure of said mattress and supplying said amplified signal to said analog-to-digital converter for converting said pressure signal to digital data at an output thereof;

a pressure adjusting circuit including a third comparator and a pair of second variable resistors connected in parallel with an input of said third comparator, said pair of second variable resistors being used to input a softness value and a hardness value to said third comparator for establishing a preset internal pressure value at an output thereof; and a pressure control circuit including a second microprocessor coupled to a time sequence circuit for receiving a pulse time sequence signal therefrom, said second microprocessor being coupled to said output of said analog-to-digital converter for input of said digital data representation of said internal pressure of said mattress and said output of said third comparator of said pressure adjusting circuit for input of said preset internal pressure value, said second microprocessor determining a pressure value responsive to said input of said digital data and said preset internal pressure value, said second microprocessor having a first output coupled to a pump for and a second output coupled to a pressure-relief electromagnetic valve for (a) output of an energization signal to said second output and a turn-off signal to said first output responsive to said pressure value being higher than said preset internal pressure value for reducing said internal pressure in said mattress, and (b) output of a turn-on signal to said first output responsive to said pressure value being lower than said said preset internal pressure value for controlling said pump to inflate said mattress.

2. The temperature and pressure control as claimed in claim 1, wherein said pump is actuated by said pressure control circuit for producing pressure pulses to inflate said air chambers responsive to actuation of a switch, said pressure pulse inflation producing a moderate pulsation in said air chambers and water reservoirs of said mattress to provide a massage effect, said pressure control circuit actuating said pressure-relief electromagnetic valve during said pressure pulse inflation to relieve mattress pressure responsive to said pressure value being higher than said preset internal pressure value.

3. A temperature control for a water bed, comprising:

a temperature detecting circuit including a pair of temperature detecting elements connected in parallel with an input of a first comparator to respectively detect an ambient air temperature and a temperature of a mattress of said water bed, said first comparator comparing said detected ambient air temperature with said detected mattress temperature and producing a resultant value at an output thereof;

a temperature adjusting circuit including a pair of variable resistors connected in parallel with an input of a second comparator, one of said variable resistors being used to input a preferred preset temperature value and the other of said variable resistors being used to input a predetermined heat dissipation rate of a quilt overlaying said mattress;

a temperature control circuit including a microprocessor coupled to a timing pulse generator for coupling pulse time sequence signals thereto, said microprocessor being coupled to said output of said temperature detecting circuit for input of said resultant value, said microprocessor being coupled to said temperature adjusting circuit for input of said preferred preset temperature value and said predetermined heat dissipation rate, said microprocessor determining a target temperature value responsive to said input of said resultant value, said preferred preset temperature value, and said predetermined heat dissipation rate, said microprocessor having an output coupled to means for heating the mattress for (a) output of a turn-off signal responsive to said mattress temperature being higher than said target temperature, and (b) output of a turn-on signal responsive to said mattress temperature being lower than said target temperature.

4. A temperature control for a water bed overlaid with an electric blanket, comprising:

a temperature detecting circuit including a pair of temperature detecting elements connected in parallel with an input of a first comparator to respectively detect an ambient air temperature and a temperature of said electric blanket, said first comparator comparing said detected ambient air temperature with said detected electric blanket temperature and producing a resultant value at an output thereof;

a temperature adjusting circuit including a pair of variable resistors connected in parallel with an input of a second comparator, one of said variable resistors being used to input a preferred preset temperature value and the other of said variable resistors being used to input a predetermined heat dissipation rate of said electric blanket;

a temperature control circuit including a microprocessor coupled to a timing pulse generator for coupling pulse time sequence signals thereto, said microprocessor being coupled to said output of said temperature detecting circuit for input of said resultant value, said microprocessor being coupled to said temperature adjusting circuit for input of said preferred preset temperature value and said predetermined heat dissipation rate, said microprocessor determining a target temperature value responsive to said input of said resultant value, said preferred preset temperature value, and said predetermined heat dissipation rate, said microprocessor having an output coupled to said electric blanket for (a) output of a turn-off signal responsive to said mattress temperature being higher than said target temperature to turn off a heating element in said electric blanket, and (b) output of a turn-on signal responsive to said mattress temperature being lower than said target temperature to turn on said heating element.

* * * * *